(12) United States Patent  (10) Patent No.: US 7,493,759 B2
Bernitsas et al.  (45) Date of Patent: Feb. 24, 2009

(54) FLUID MOTION ENERGY CONVERTER

(75) Inventors: Michael M Bernitsas, Saline, MI (US);
Kamaldev Raghavan, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 428 days.

(21) Appl. No.: 11/272,504

(22) Filed: Nov. 10, 2005

(65) Prior Publication Data

US 2008/0295509 A1   Dec. 4, 2008

Related U.S. Application Data

(60) Provisional application No. 60/628,152, filed on Nov. 15, 2004, provisional application No. 60/644,749, filed on Jan. 18, 2005.

(51) Int. Cl.
*F03C 1/00* (2006.01)
(52) U.S. Cl. .......................................... 60/497; 60/505
(58) Field of Classification Search ................... 60/495, 60/497, 505
See application file for complete search history.

(56) References Cited

U.S. PATENT DOCUMENTS

| 3,959,663 | A | * | 5/1976 | Rusby ........................... 290/53 |
| 4,024,409 | A | | 5/1977 | Payne |
| 4,241,579 | A | | 12/1980 | Borgren |
| 4,413,956 | A | | 11/1983 | Berg |
| 5,426,332 | A | | 6/1995 | Ullman et al. |
| 6,153,944 | A | | 11/2000 | Clark |
| 6,305,165 | B1 | * | 10/2001 | Mizuki, Sr. ................... 60/496 |
| 2004/0093863 | A1 | * | 5/2004 | Huang ........................... 60/495 |

OTHER PUBLICATIONS

Holzman, David C., "*Blue Power—Turning Tides into Electricity*," Dec. 2007, Environment Health Perspectives (Environews|Innovations), vol. 115, No. 12, pp. A591-A593.

* cited by examiner

*Primary Examiner*—Hoang M Nguyen
(74) *Attorney, Agent, or Firm*—Harness, Dickey & Pierce, P.L.C.

(57) ABSTRACT

A converter for producing useable energy from fluid motion of a fluid medium. The converter includes a support structure, at least one movable element immersed in the fluid medium and supported externally on the support structure such that the movable element can move relatively to the structure in response to the fluid motion by vortex induced motion, galloping or combination thereof, and at least one power device supported on the support structure and coupled to the movable element. The power device converts motion of the movable element to useable energy.

19 Claims, 7 Drawing Sheets

TABLE I

| SCALE | POWER P (MW) | N | D (m) | L (m) | h (m) | S (m$^2$) | W (ktons) |
|---|---|---|---|---|---|---|---|
| Giga | 1000 | 52,700 | 1 | 20 | 30 | 598,937 | 668 |
| Mega | 102 | 5,385 | 1 | 20 | 20 | 84,984 | 68.3 |
| Large | 10 | 526 | 1 | 20 | 15 | 10,117 | 6.67 |
| Medium | 1.03 | 217 | 0.5 | 10 | 10 | 809 | 0.66 |
| Small | 0.1 | 534 | 0.1 | 2 | 5 | 37 m$^2$ | 0.066 |
| Micro | 0.05 | 21 | 0.05 | 1 | 5 | 11 m$^2$ | 0.0033 |

*Fig-10*

FLUID MOTION ENERGY CONVERTER

CROSS-REFERENCE TO RELATED APPLICATIONS

This application claims the benefit of U.S. Provisional Application No. 60/628,152, filed on Nov. 15, 2004 and U.S. Provisional Application No. 60/644,749, filed on Jan. 18, 2005. The disclosures of the above applications are incorporated herein by reference.

INTRODUCTION

Ocean or fresh water or other moving fluid provides clean and renewable energy. The total energy flux caused by surface and under-water currents of the world has been estimated at 280 trillion watt-hours. World-wide there are many sites with velocities of 5 knots or higher that are located in densely populated areas, including the United States, Japan, the United Kingdom, Philippines, Ireland, and Italy. The potential world wide wave energy economic distribution in the electric market is estimated at 200 TWh ($10^{12}$ Wh).

Several devices have been conceived, studied and built, but the generated energy divided by the occupied volume (energy density) is low. Although the existing devices can be satisfactory for their intended purposes, there is still a need for procedures and devices that can generate energy continuously and at higher densities.

SUMMARY

The present teachings provide a converter for producing useable energy from fluid motion of a fluid medium. The converter includes a support structure, at least one movable element immersed in the fluid medium and supported externally on the support structure such that the movable element can move relatively to the structure in response to the fluid motion by vortex induced motion, galloping or combination thereof, and at least one power device supported on the support structure and coupled to the movable element. The power device converts motion of the movable element to useable energy.

The present teachings provide a converter for producing useable energy from fluid motion of a fluid medium, and including a support structure, a plurality of movable elements immersed in the fluid medium and supported externally on the support structure such that each movable element can move relatively to the structure in response to the fluid motion by vortex induced motion, galloping motion or combination thereof, and at least one power device supported on the support structure and coupled to at least one movable element. The power device converting motion of the movable elements relatively to the structure to useable energy.

The present teachings provide a method for converting fluid motion of a fluid medium to useable energy. The method includes immersing at least one movable element in the fluid medium, supporting the movable element externally on a structure, allowing vortex induced motion, galloping motion or combination thereof of the movable element relatively to the structure in response to the fluid motion, and converting the motion of the movable element relatively to the structure into useable energy.

Further areas of applicability of the present invention will become apparent from the description provided hereinafter. It should be understood that the description and specific examples are intended for purposes of illustration only and are not intended to limit the scope of the invention.

BRIEF DESCRIPTION OF THE DRAWINGS

The present invention will become more fully understood from the detailed description and the accompanying drawings, wherein.

DESCRIPTION OF VARIOUS ASPECTS

The following description is merely exemplary in nature and is in no way intended to limit the invention, its application, or uses. For example, although the present teachings are illustrated for applications in connection with oceans, rivers, lakes or other open water bodies, the present teachings can be used in applications involving bodies of fluid contained in vessels of any size. Similarly, the present teachings are applicable at any scale, ranging from large scale power plants capable of generating power of the order of Giga Watts to portable devices generating power of the order of a fraction of a Watt. Moreover, the small-scale devices can be provided as kits for easy transport, assembled on location, disassemble and re-assembled as desired.

The present teachings provide an efficient energy converter, which can harness certain types of fluid motion produced by fluid elastic instability and convert the fluid motion caused by the fluid elastic instability into a readily useable form of energy, such as electricity. Fluid elastic instability refers to fluid motion-structure interaction phenomena which result in instability. The elastic instability phenomena that are most relevant to energy extraction include the phenomena known as vortex induced vibrations ("VIV") or more generally vortex induced motion ("VIM"), galloping, and fluttering.

VIV/VIM is an oscillatory or vibratory motion typically observed in bluff bodies mounted on supports in a moving fluid and shedding vortices due to the ambient flow and their own induced motion. The bodies and the supports can be elastic or rigid. VIM is a nonlinear resonance phenomenon, as opposed to linear resonance which occurs only when the frequency of excitation from the flow, such as waves, for example, is equal to the natural frequency of the oscillating body. Linear resonance has a very limited range of large amplitude oscillations and is used in existing energy devices with oscillating buoys, flaps, foils, or water columns.

Galloping can be observed when two or more cylinders or other elongated bodies are arranged parallel to one another and perpendicular to the direction of flow at higher velocity than the velocity where VIM is observed. The parallel elongated bodies can define a plane that is orthogonal to the direction of flow or a plane that is co-planar to the direction of flow. The elongated bodies, although parallel, can be positioned in staggered or non-staggered arrangements. The term galloping is usually applied to large-amplitude, low-frequency oscillation caused by fluid instability. When velocity increases, the associated amplitudes may in principle grow without limit. Any bluff profile that can gallop can also exhibit vortex-induced vibrations or vortex induced motion, since an appreciable afterbody is a requirement for both. During galloping the oscillation amplitudes of the bodies depend very strongly on their relative locations. The oscillations of one body can affect the vortex shedding and synchronization (lock-in) of another body. Although in some cases the displacement of the front body is larger than the displacement of a rear body, in most of the cases the rear body has larger amplitude oscillations. Bodies having a cross section that is not circular, such as, for example, a square or other polygonal cross-section, can gallop even when not in array form. A single non-circular elongated body can undergo galloping, for example.

Fluttering is also an instability induced by fluid motion-structure interaction. Typically, a slender body undergoes asymptotically periodic or quasi-periodic motion in a flow. Fluttering is the result of an instability phenomenon called Hopf bifurcation and is not generally caused be vortex shedding. Fluttering is, at least phenomenologically, distinct from VIV/VIM, as those terms are currently used and presently understood.

The present teachings utilize only VIM and galloping, and not fluttering, to extract useable energy from a flowing medium.

Figure 1:
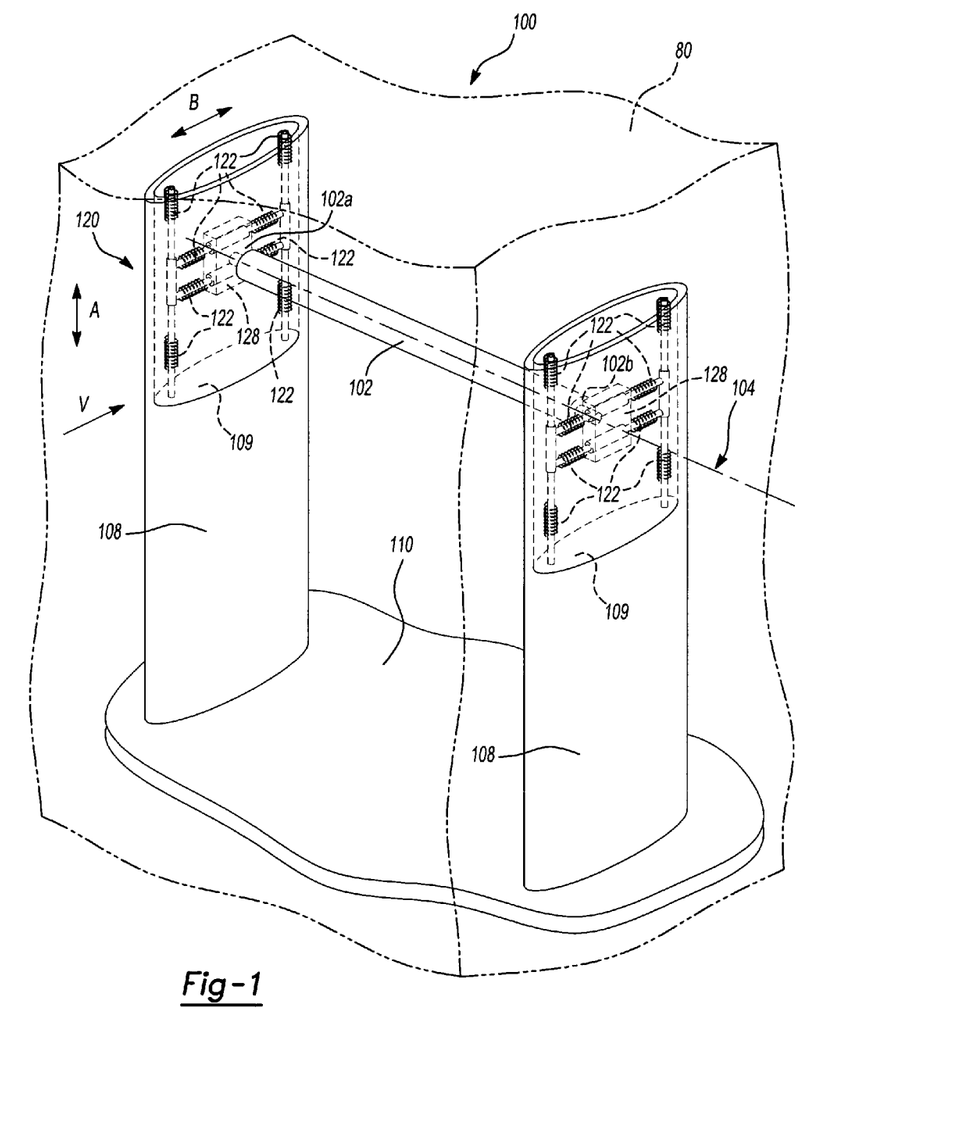
FIG. 1 is a perspective view of an exemplary fluid motion energy converter according to the present teachings.

Referring to FIG. 1, an exemplary energy converter 100 according to the present teachings includes a movable element 102 supported on a support structure 104 which is external to the movable element 102. The movable element 102 is immersed in a fluid medium 80 generally flowing or capable of flowing in the direction indicated by fluid velocity V. The velocity V can be substantially perpendicular or can have a component which is substantially perpendicular to the movable element 102. The support structure can include first and second elongated members or support piles 108 coupled to the first and second ends 102a, 102b of the movable element 102 by connecting assemblies 120. The support piles 108 can be hollow defining an interior space 109, in which the connecting assemblies 120, as well as other instruments, can be received. The connecting assemblies 120 between the support piles 108 and the movable elements 102 can be configured to allow substantially uni-planar motion in directions indicated by (double) arrow A in FIGS. 2 and 4, or bi-planar motion in directions indicated by (double) arrows A and B in FIGS. 1, 3 and 6. The uni-planar motion illustrated in FIGS. 2 and 4 can take place in a first plane substantially perpendicular to the velocity V and defined by an axis C extending between the first and second ends 102, 102b of the movable element 102 and the direction defined by arrow A. The bi-planar motion illustrated in FIGS. 1, 3, and 6 can additionally include motion in a second plane defined by the velocity V and the axis C of the movable body. In large scale applications in which fluid medium is a natural body of water, such as an ocean water or fresh water from lakes, ponds, and rivers, the first and second planes of motion are substantially vertical and horizontal, respectively. It should be appreciated, however, that in other applications, such as in small-scale applications and or applications involving an artificial fluid flow, the first and second planes need not be defined relatively to gravity forces. More generally, the first and second planes can be defined relatively to the direction of fluid flow and the axis of the movable element 102 and the motion of the movable element 102 can take place on one of or both the first and second elements with the axis C of the movable element 102 remaining parallel to itself during the motion. It will be further appreciated that for bi-planar motion the trajectory of the motion can define a FIG. 8 shape.

The support piles 108 can be configured to prevent their own undesirable vortex induced vibrations. The support piles 108 can be, for example, hydrodynamically faired as shown in FIG. 1. Additionally vortex spoilers can be used with the support piles 108 to prevent VIV of the support piles 108. The vortex spoilers can be provided in various forms, such as fairing attachments, helical strakes, drag inducing appendages, and other VIV suppression devices, including those available by CRP Balmoral Inc, Houston, Tex.

The movable elements 102 can be elongated elements, such as prismatic or cylindrical elements, as illustrated in FIG. 1, although movable elements 102 with different shapes, such as cylinders, ellipsoids, ovoids, spheres, combinations or portions thereof or other bluff bodies can also be used. Furthermore, the cross-section of the movable elements 102 can be circular, oval, elliptical, oblong, square or rectangular with or without rounded corners, polygonal with or without rounded corners, and combinations or portions thereof. Additionally, the cross-section can include turbulence stimulators, such as small sharp protrusions and surface roughness, as discussed below.

Figure 2:
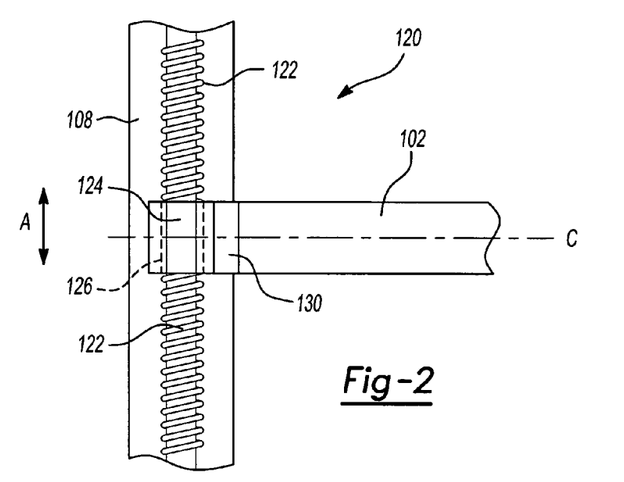
FIG. 2 is a detail of a connection for an exemplary fluid motion energy converter according to the present teachings shown for allowing motion with one degree of freedom.
Figure 3:
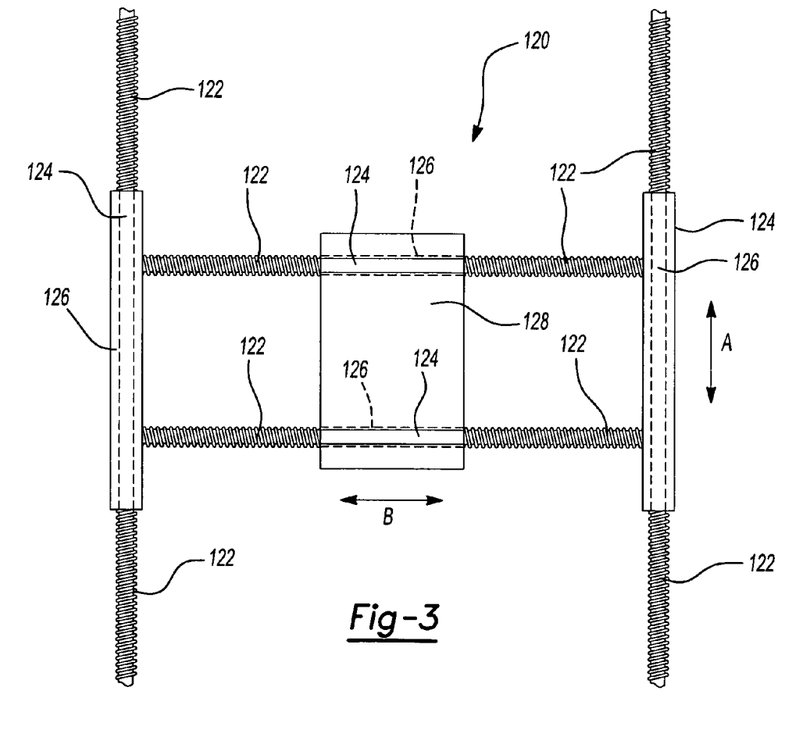
FIG. 3 is a detail of a connection for an exemplary fluid motion energy converter according to the present teachings shown for allowing motion with two degrees of freedom.

In an illustrative aspect, the connecting assembly 120 can include biasing elements 122, such as, for example, springs, coils, leaf springs, or other elements providing resilient, elastic, superelastic, or shape-memory support, and arranged to allow motion transversely to the axis C of the movable element 102 in the direction A, as illustrated in FIG. 2, or in both directions A and B, both transversely to the movable element 102, as illustrated in FIGS. 1 and 3. It will be appreciated by the person of ordinary skill in the art that other biasing mechanisms capable of providing restorative forces for allowing vibration/oscillation of the moveable elements can be used, instead of or in addition to spring-like structures. Bearings 126 can slide on shafts 124 configured for motion in the directions A and B. Bearing casings 128 can be provided for enclosing the bearings 126 and supporting the biasing elements 122. End connectors 130, such as pins or other connecting devices can be used to attach the ends 102a, 102b of the moveable element 102 on the bearing casings 128, on the opposite side from the biasing elements 122. It will be appreciated that the connecting assembly 120 is not limited by the arrangement and combination of elements illustrated in FIGS. 2 and 3. Other arrangements within the purview of a person of ordinary skill in the art can be used to provide the desired degree of freedom for motion of the movable element 102 in directions orthogonal to the axis C of the movable element, while keeping the axis C substantially parallel to itself during such motion. Active control mechanisms, such as, for example, controllable servomotors, can be added as desired to assist in maintaining such motion.

The arrangement of FIG. 1, including two support piles 108 and a movable element 102 can be used as a modular unit that can be repeated in two or three dimensions to define an energy converter 100 having a substantially two-dimensional or a three-dimensional array form. The energy converter 100 can include a support structure 104, including the support piles 108 and equipment mounted therein, as well as a foundation 110. The uppermost unit of the energy converter 100 can be telescopic, such that it can extend for surfacing out of the fluid medium 80 for easier access to equipment inside the support piles 108, for maintenance and repairs. The uppermost unit can also include a cap (not shown) with a fluid-tight hatch, which can be opened to provide access to the inner space 109 of the support piles 108. In some applications, depending on the scale of the energy converter 100, an access route in the form of a ladder, lift, staircase or other can be provided inside the support piles 108. Access can also be provided by pressurized submarine-type double hatch.

Figure 5:
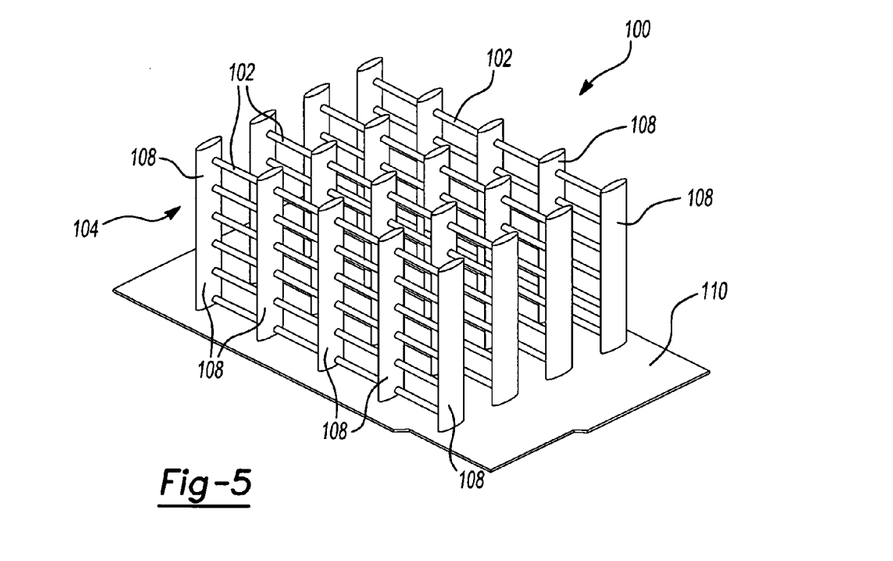
FIG. 5 is a perspective view of an exemplary fluid motion energy converter according to the present teachings.

FIG. 5 illustrates an exemplary three-dimensional energy converter 100 including four rows of two dimensional units. In this example, each row unit includes five support piles 108 and six movable elements 102 between adjacent support piles 108. It will be appreciated that the number and arrangement of support piles 108 and movable elements 102 can vary depending on the particular applications, as discussed below. The foundation 110 can be positioned at the bottom of a river or a lake, on a seabed, or on any other fixed or floating offshore or other marine structure or can also be a portion of such structure. The foundation 110 can also be floating and positioned by a mooring system or positioned dynamically by thrusters driven by a control system and receiving positioning input by beacons or by a land-based, satellite or combined global positioning system (GPS).

Figure 4:
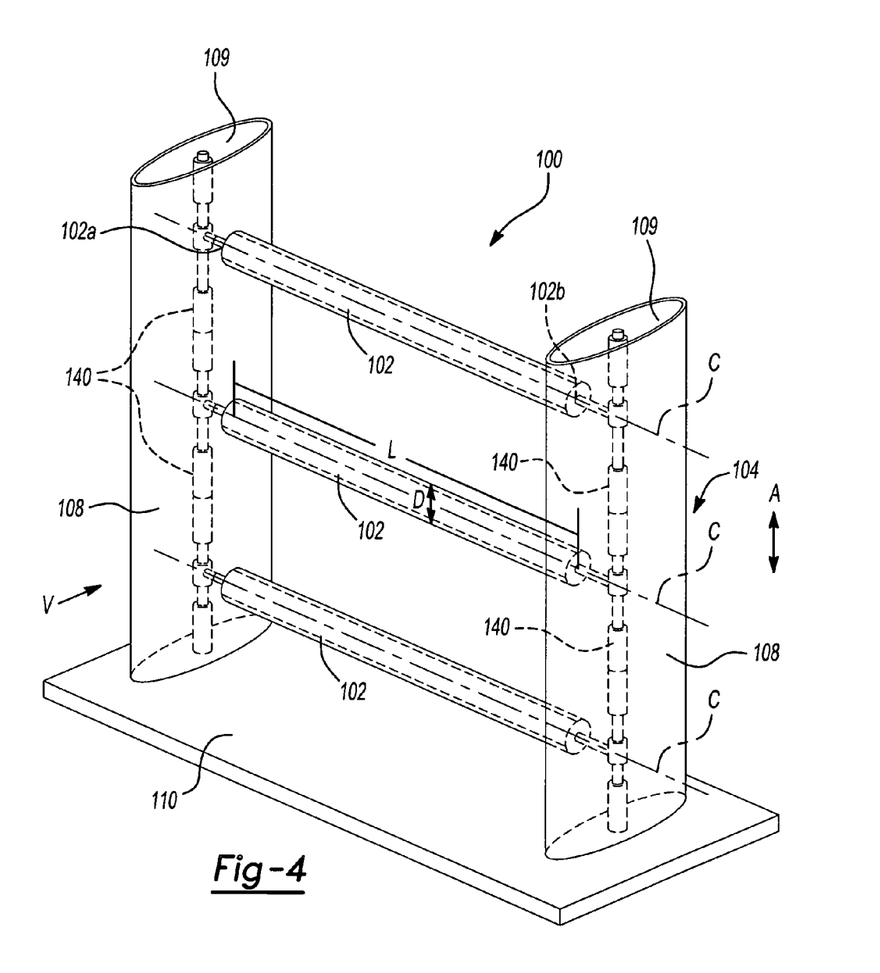
FIG. 4 is a perspective view of an exemplary fluid motion energy converter according to the present teachings.

The energy converter 100 can include a power system 140 for converting the motion of the movable elements 102 to readily useable form of energy. The power system 140 can be mounted in the inner space 109 of the support piles 108, as illustrated in FIG. 4, or can be externally mounted or free-standing on the foundation 110. The power system can include commercially available power devices 142, such as those illustrated in FIGS. 7-9, combinations thereof, or other power devices. For example, although a combination of linear power devices can be used for bi-planar motion, a planar power device can be constructed using a somewhat flattened magnet that can move in a coil in two directions in a plane.

Figure 7:
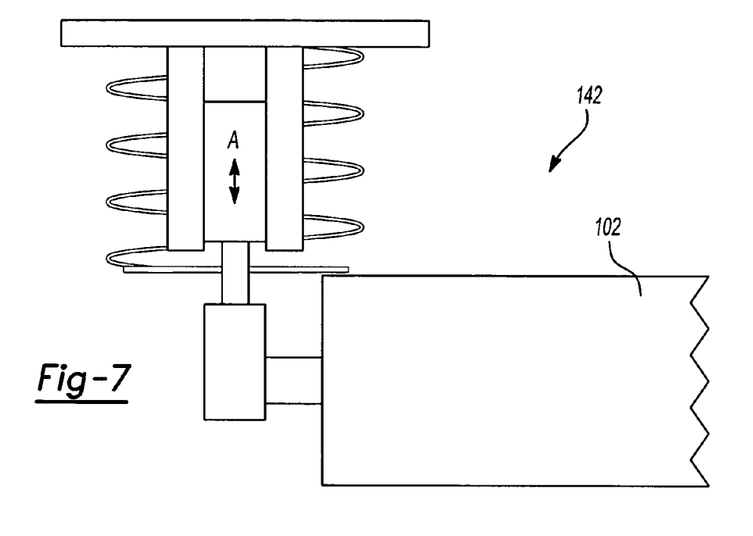
FIG. 7 is a diagrammatic view of a linear power device.
Figure 8:
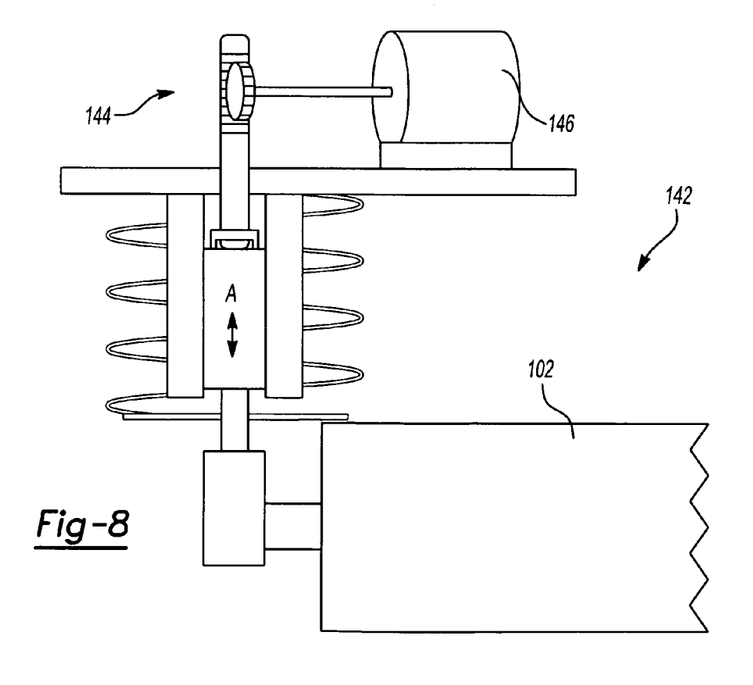
FIG. 8 is a diagrammatic view of a rotary power device.
Figure 9:
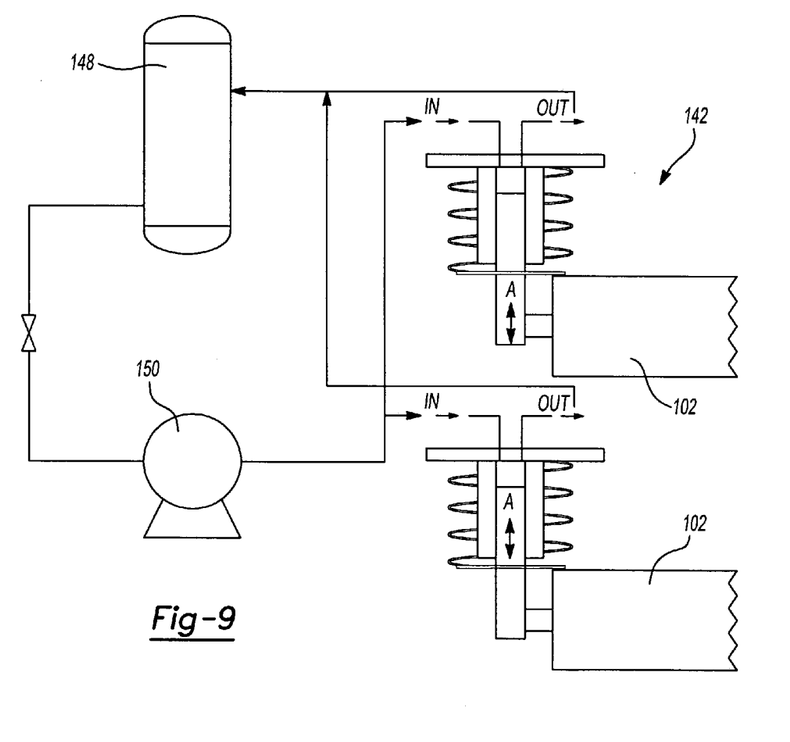
FIG. 9 is a diagrammatic view of a hydraulic power device.

FIG. 7 illustrates an exemplary linear power device 142 that converts linear reciprocation motion in the direction A from the movable element 108 to electric energy using a permanent magnet and a coil. Low speed reciprocating generators for direct drive energy converters are known in the art. See for example the article *A low speed reciprocating permanent magnet generator for direct drive wave energy converters*, Mueller M. A. & Baker N. J., IEE Power Electronics and Electrical Machines & Drives Conference, Bath, April 2002, pp 468-473. FIG. 8 illustrates a rotary power device 142 using a gear system 144, such as a rack and pinion to convert linear reciprocation motion in the direction A to rotary motion for use with a rotary generator 146. Rotary generator systems are known in the art and are commercially available from ABB Inc, Norwalk, Conn. FIG. 9 illustrates a hydraulic power device 142 which can use the reciprocation motion of two movable elements 102 to pressurized fluid energy in a tank 148 for subsequent conversion to electricity using a generator 150. Hydraulic generators as integrated systems are available from distributors of Cummins, Inc., Columbus, Ind. It will be appreciated that various combinations of power devices 142, or planar power devices, such as those described above, can be used with the energy converter 100.

As discussed above the energy converter 100 is scalable and flexible. The energy converter 100 can be constructed by combining modular units of different sizes and numbers, varying the number, the dimensions, and the cross-section of the movable elements 102, varying the spatial density of the movable elements 102 and their relative arrangement, including staggered and non-staggered alignments, varying the relative arrangement of the movable elements relatively to the direction of the flow or the fluid medium's velocity profile, varying the relative location of the movable elements 102 in the fluid medium 80. The staggered arrangements can include staggering in one or two directions substantially orthogonal to the axis C of the movable elements 102. Further, the oscillating mass ratio m* of the movable element, defined as the ratio of the movable element 102, including all its moving parts and attachments, over the displaced fluid mass, can be varied. Additional parameters that can be changed include the stiffnesses of the biasing elements 122, the types of the power devices 142 and associated damping choices.

The various parameters described above can be selected such that the movable elements 102 operate in the range of Reynolds numbers "Re" that support VIV, and that such range is as broad as possible. Further, the above parameters can be selected to provide the broadest synchronization range for the purpose of maximizing the mechanical energy produced by the motion of the movable elements 102. The following paragraphs describe various theoretical considerations that can be used in selecting appropriate parameters for a particular application.

For moveable elements 102 that are cylindrical with circular cross-sections VIV can occur for the entire range of Reynolds number Re except for Re<40 corresponding to the pre-vortex-shedding range; 150<Re<400 corresponding to the Tritton transition region; and $3 \times 10^5 < Re < 5 \times 10^5$ corresponding to the transition region from laminar to turbulent flow. These ranges are obtained experimentally and are valid for smooth cylindrical elements 102. The ranges are affected by various factors, including, for example, the condition of the cylinder surface, the ambient flow vorticity, fluid conditions affecting its viscosity, such as salinity and temperature. Some of these factors can be modified in the design or operation state in a passive or active manner to ensure that the movable elements 102 remain in VIV for substantially the entire practical range of Reynolds numbers. A non-exhaustive list of techniques which can be used to achieve broad range VIV include the following:

(a) If the movable element 102 has a circular cross-section, the diameter of the cross-section can be changed, because the Reynolds number changes linearly proportionally with the diameter. This change is practical only for small changes in diameter;

(b) The cross section of the movable element 102 can be changed. A half-circle facing the flow, a shape between a circle and its enclosing square, an oblong shape with its long axis placed transversely to the flow, or any of the previous shapes with small but sharp protrusions to stimulate turbulence will change significantly the three ranges of non-VIV discussed above;

(c) Introduce surface roughness, which has a strong impact on the non-VIV ranges. Introducing surface roughness passively will be very effective when the incoming flow conditions are known a priori and do not change significantly over time.

(d) Introduce fixed (passive) turbulence stimulators which can be very effective when the incoming flow conditions are known a priori and do not change significantly over time.

(e) Introduce controllable (active) turbulence stimulators when there is significant variation of the incoming flow velocity.

Specialized turbulence stimulators employing a wire matrix are commercially available from Cal Gavin Limited, Alcester, England, and can be used for specific applications.

Additionally, the interaction of the fluid flowing over the energy converter 100 can be controlled by controlling the timing of vortex shedding, and therefore the turbulence behind the movable elements 102 by different methods, such as, for example, by using plasma actuators to increase the frequency and amplitude of oscillation, thereby increasing electrical energy generation. See, for example, "Plasma-Based Actuators for Cylinder Wake Vortex Control", Thomas E. McLaughlin et al, 2nd AIAA Flow Control Conference 28 Jun.-1 Jul. 2004, Portland, Oreg.

For a given Reynolds number, a movable element 102 can be in synchronization over broad ranges depending on the oscillating mass ratio m*, the displaced fluid mass, and the stiffness of the supporting springs. The synchronization range can be infinite for $m^* < m_{crit}$, where $m_{crit}$ is an experimentally determined critical mass ratio, substantially equal to 0.54. This range, however, does not result in maximum amplitude of oscillation which would in turn maximize the mechanical energy of the movable cylinder 102. The energy converter 100 can substantially increase or maximize overall the mechanical energy by identifying a broad enough range of synchronization with a high enough amplitude of oscillation by selecting appropriate parameters. Thus, when m* is greater than the critical mass ratio $m_{crit}$, the range of synchronization decreases, but the amplitude of oscillation can be increased by controlling various parameters, as discussed above, such as the stiffness of the biasing elements 122, the oscillating mass of the movable element 102 including any appendages thereon, damping introduced in the mechanical oscillations of the movable element 102 by the power devices 142, and the length L of each movable element 102.

In vortex induced vibration/motion, the correlation length of the flow past the movable element 102 is defined as the length of the movable element 102 along which vortices shed in phase. The correlation length of each movable element 102 in lock-in in the energy converter 100 can be selected to be equal to its length L. The length L of the movable element 102 can be selected to be sufficiently long to ensure low m*, but not so long that could result in a flexural mode excitation which can reduce correlation length.

The stiffness of the biasing elements 122 can be controlled by an automatic control mechanism for increasing or maximizing the range of nonlinear resonance without causing the amplitude of the motion of the movable element 102 to reach a self-limiting value in the case of VIV. There is no such self-limiting value in the case of galloping instability. Various stiffness control mechanisms are within the purview of the person of ordinary skill in the art, such as those described in "Adaptive Passive Vibration Control", M. A. Franchek, M. W. Ryan and R. J. Bernhard, *Journal of Sound and Vibration*, 1995, 189(5), 565-585; U.S. Pat. No. 4,935,651; "The Electrodynamic Vibration Absorber", "A. K. Abu-Akeel, *Journal of Engineering for Industry*, 1967, 741-748, and others.

The power P that can be extracted by the energy converter 100 from the fluid flow can be provided by the following equation:

$$P = \eta \frac{1}{2}\rho DLV^3$$

where $\rho$ is the density of the fluid medium, D is the cylinder diameter, L is the cylinder length, V is the flow velocity in the case of a steady current, and $\eta$ an efficiency coefficient.

For uni-planar motion the combined stiffness k of the biasing elements 122 can be estimated from the following theoretical equation when the mass ratio m* is greater than 0.54:

$$\frac{f^*(5.75)^2}{\rho\pi^3 L(m^* - 0.54)} \leq \frac{V^2}{k} \leq \frac{f^*(9.25)^2}{\rho\pi^3 L(m^* - 0.54)}$$

where $$f^* = \frac{f}{f_{n,water}},$$

f is the frequency of oscillation and $f_{n,water}$ is the natural frequency in water which is usually one for high mass ratio (m*>10) and greater than one for low mass ratio.

For m* less than 0.54 any stiffness can be used, at least theoretically. See, for example, the article "Resonance forever: existence of a critical mass and an infinite regime of resonance in vortex-induced vibration" R. Govardhan and C. H. K. Williamson, *J. Fluid Mech.* (2002), vol. 473, pp. 147.

The power system 140, which converts the mechanical energy in the movable elements 102 to electricity, can include an electrical generation control, which, for example, can include adjustable resistance in the electrical circuit for introducing an amount of damping to the mechanical system of the vortex induced motion, and a control system for controlling the mount of damping. Introduction of electrical resistance results in useful and harnessable electricity. Too small electrical resistance can result in VIV exceeding its self-limiting amplitude, causing VIV fluctuations and intermittent energy generation. Too large amount of electrical resistance can result in excessive damping of the VIV motion, effectively eliminating VIV and energy generation.

Various materials can be used for the construction of the components of the energy converted taking into account the environment of operation in a particular application. Thin-walled elongated movable elements 102 can be used for weight reduction and for providing sufficient rigidity or stiffness. Exemplary materials include coated aluminum, composites and sandwich panels. Coating is can be important for preventing corrosion or marine fouling.

A seal mechanism can be used to seal the interior of the support piles 108 and the equipment therein from the fluid environment at the point of connection of the movable element ends 102a 102b to the bearing casing 128. A variety of seal mechanisms are commercially available and can be used singly or in combination in energy converter 100. Seal mechanisms can include metal or composite material plates supported by springs and sealed with mechanical seals, such as those available from MIPR CORP, Newcastle, Me.; membranes, such as those available from John Crane USA, Pittsburgh, Pa.; expansions joints, such as those available from Piping Technology and Products Inc., Houston, Tex., and others.

All the electrical and mechanical equipment used in the operation and maintenance of the energy converter 100 can be housed in the inner space 109 of the support piles 108, as discussed above. In this regard, it is emphasized that no equipment or other structure is contained inside the movable elements 102, which can be solid or hollow, or hollow and filled with a lightweight core for weight reduction purposes. Any equipment or support or other structure inside the movable elements 102 can limit the amplitude of motion of the movable elements 102 and cause vortex induced motion to cease.

A uni-planar working prototype of the energy converter 100, built in October 2005, includes two support piles 108 and one movable element 102 having length L=0.914 m and a hollow circular cross-section of outer diameter D=0.127 m and wall thickness of 3.17 mm. The biasing elements 122 in the prototype are springs with combined total stiffness k equal to 820 N/m. The prototype is tested in a water medium with a flow velocity of 1 m/sec at the Marine Hydrodynamics Lab of the University of Michigan, Ann Arbor, Mich. For the tests conducted in November 2005, the prototype of the energy converter 100 provides an efficiency η up to 60% even at the low flow velocities of the tests. Amplitudes of vortex induced motion nearly twice the diameter D of the oscillating cylinder are achieved. Such amplification does not seem to have been previously observed.

Figure 6:
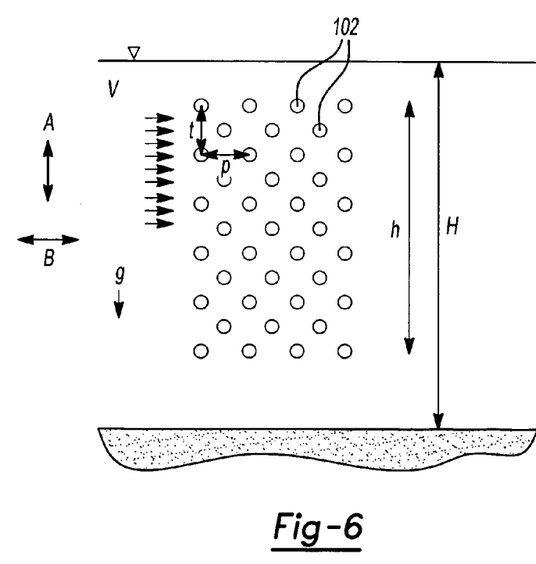
FIG. 6 is a sectional view of an exemplary fluid motion energy converter according to the present teachings illustrating a staggered array of movable elements.
Figure 10:
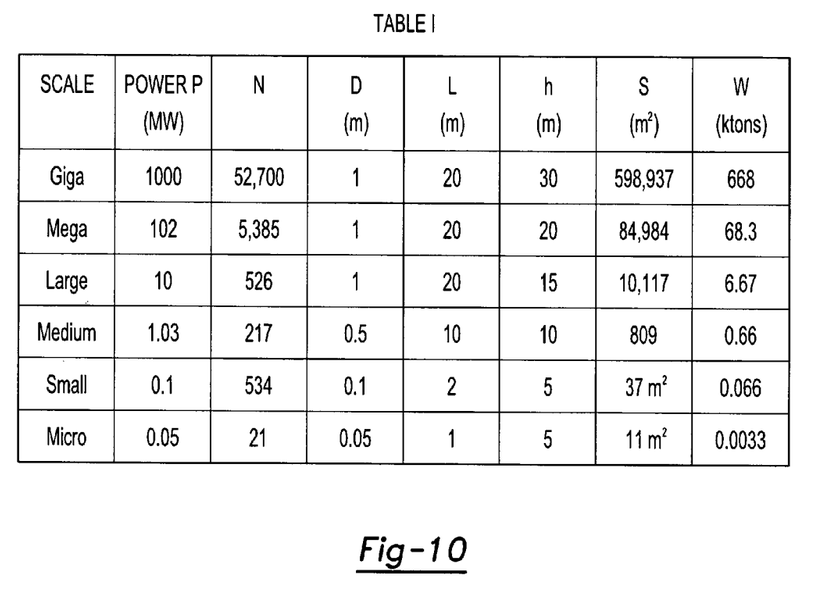
FIG. 10 is a table illustrating values of various parameters for different scale energy converters according to the present teachings.

Referring to FIGS. 5, 6 and Table I of FIG. 10, conservative estimates of power P generated by five exemplary applications for different scale energy generation projects are illustrated in table form. The estimates are based on a flow velocity of 3 knots and with a conservative efficiency of 52%, as compared to the experimental results obtained in the prototype discussed above. In Table 1, P is the generated power P in MW, for an energy converter 100 having N cylindrical elements 102 arranged in the arrangement illustrated in FIG. 4, in which the elements 102 are staggered in the flow direction and are aligned in the other two directions. Each element 102 has diameter D and length L. The spacing of the elements 102 can be defined by the distances t and p, with p=8 D and t=5 D, as shown in FIG. 6. These exemplary values for t and p can be selected when interference between the elements 102 during the vortex induced motion needs to be avoided. As shown in FIG. 4, h is a representative height of the energy converter 100 and S is the area of the footprint of the energy converter plant. The oscillating mass ratio m* is estimated as 2.2 and the amplitude of oscillation as 0.8 times D. For each scale in Table I, the estimated overall weight of the energy converter 100, including the weight of the support structure 104 including the weight of the foundation 110, when are appropriate, are provided as an indication of the power density of the corresponding energy converter 100. It should be appreciated by the person of ordinary skill in the art that the values provided in Table 1, as well as the arrangements of FIGS. 5 and 6 are merely representative of many possible configurations and dimensions that can produce the corresponding scale of required power output.

The exemplary Giga scale energy converter model of Table I can be appropriate for a power plant supporting a city with over a 1,000,000 households, when a household is estimated to use on the average about 1 kW per year according to public U.S. Government data. Several such power plants can be positioned properly to support bigger cities. As side benefit, the energy converter of the Giga scale can serve as breakwater to protect shoreline. The Giga scale energy converter can be deployed in oceans, the Great Lakes, and other large bodies of water.

The exemplary Mega scale energy converter model of Table I can be appropriate for a power plant supporting a city with fewer than 1,000,000 households. The Mega scale energy converter can be used to provide clean energy to a factory, and can also serve as breakwater to protect shoreline. The Mega scale energy converter can be deployed in oceans, the Great Lakes, and other relatively large bodies of water.

The exemplary large scale energy converter model of Table I can be appropriate for a power plant supporting a city with fewer than 100,000 households. The large scale energy converter can be used to provide clean energy, for example, to a factory, a large naval base, an offshore oil rig and other comparable scale facilities, and can also serve as breakwater to protect shoreline. The large scale energy converter can be deployed in oceans, the Great Lakes, and other lakes and rivers.

The exemplary medium scale energy converter model of Table I can be appropriate for a power plant supporting a town or community with fewer than 10,000 households. The medium scale energy converter can be used to provide clean energy to, for example, a small factory, a naval base, an offshore oil rig, a moored cruise ship or floating casino, or other ship or floating structure, and other comparable scale facilities. In the case of the oil rig application, the medium scale energy converter can be mounted on the oil rig. In the case of the moored ship, the energy converter can be deployed under the moored ship to substitute for engine-idle mode.

The exemplary small scale energy converter model of Table I can be appropriate for a power plant supporting a community with fewer 1,000 households or families. The small scale energy converter can be used to provide clean energy, for example, to a small naval operation, to an offshore oil rig on which the energy converter is mounted, or to a moored ship to substitute for engine-idle mode, under which the energy converter can be deployed.

The exemplary micro hydro scale energy converter model of Table I can be appropriate for a power plant supporting a camp or community with fewer than 100 families. The micro scale energy converter can be used to provide clean energy, for example, to a small naval operation, to an offshore oil rig on which the energy converter is mounted, or to a moored ship to substitute for engine-idle mode, under which the energy converter can be deployed.

As discussed above, and depending on the application, various ways of founding or mounting the energy converter can be used including the following: jacket-type foundation typical of offshore platforms on soft marine sediments; gravity-type foundation typical of offshore platforms on hard sea-bed; tension leg platform type of foundation for deeper waters; anchoring for smaller systems used in lakes and rivers; mounting on an offshore platform to generate electricity for the platform; mounting under a moored ship or a boat; mounting on a floating device to provide energy to instrumentation, and other mounting methods.

Giga, Mega, large and medium scale energy converter power plants discussed above can require heavy marine foundations. Smaller scale energy converters can be mounted on vessels, boats, ships, offshore platforms. The smaller converters can also be provided in a kit and assembled by the end user. Accordingly the smaller scale energy converters can be disassembled and moved to a different location or vessel, and then reassembled.

From the above discussion, it will be appreciated that the energy converter 100 of the present teachings is a scalable and flexible energy conversion device that can harness natural renewable fluid flow or other artificial fluid flow and provide energy in readily useable form, such as electric energy, for a particular application. The energy converter takes advantage of and enhances the typically undesirable instability phenomenon of vortex induced vibration/motion and allows variable amplitude motion to the greatest possible amplitude that can be achieved. Further, the energy converter 100 can be used in bi-planar motion of two degrees of freedom, further enhancing vortex induced vibration/motion. The energy converter 100 can operate with high values of correlation lengths in nonlinear resonance of the oscillating elements 102. The energy converter 100 can optimize the generation of electricity by controlling electrical output and mechanical damping.

Although exemplary embodiments and configurations for the energy converter 100 are discussed above, it will be appreciated that many variations of the geometry, parameters and combinations of various parts can be used within the spirit and knowledge provided by the present teachings. For example, the movable elements 102 can be placed at variable distances therebetween and can have a wide range of lengths. Although movable elements 102 in the form of elongated bodies are illustrated in the drawings, the movable elements 102 can be replaced by spheres, whose critical mass ratio 0.72. Numerous other modifications and options, some of which have been discussed above, are within the purview of the person of ordinary skill in the art.

The foregoing discussion discloses and describes merely exemplary arrangements of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A converter for producing useable energy from fluid motion of a fluid medium, the converter comprising:
   a foundation submerged in the fluid medium;
   a support structure including first and second support piles directly affixed on the foundation substantially perpendicularly to the foundation and perpendicular to a velocity direction of the fluid motion;
   at least one movable element submerged in the fluid medium, the movable element having first and second ends along a longitudinal axis, the first and second ends movably coupled to the first and second piles with first and second mechanisms respectively, such that the movable element can move relatively to the first and second piles along first and second axes substantially perpendicular to the longitudinal axis of the movable element, the first axis substantially parallel to the velocity direction and the second axis substantially perpendicular to the velocity direction, in response to each of vortex induced fluid motion, or galloping fluid motion or combination thereof; and
   at least one power device supported on the support structure and coupled to the movable element, the power device converting motion of the movable element to useable energy.

2. The converter of claim 1, wherein the movable element is elongated and has a polygonal, circular, elliptical or curvilinear cross-section.

3. The converter of claim 1, wherein the movable element is cylindrical or spherical or ellipsoidal.

4. The converter of claim 1, wherein the movable element is solid or hollow with or without a core.

5. The converter of claim 1, wherein the movable element can oscillate relatively to the support structure in two non-parallel planes.

6. The converter of claim 1, wherein the power device is a linear power device or a rotary power device or a hydraulic power device, or a combination thereof, or a planar power device.

7. The converter of claim 1, wherein the support structure includes a plurality of piles and wherein the converter further comprises a plurality of movable elements, each movable element movably mounted between two piles from the plurality of piles with a biasing mechanisms, each biasing mechanism including a plurality of springs arranged on a plane perpendicular to the longitudinal axis, the plurality of movable elements defining a three-dimensional array.

8. The converter of claim 7, wherein each movable element has a longitudinal axis, and wherein the longitudinal axes are parallel.

9. The converter of claim 8, wherein the longitudinal axes are staggered relatively to the velocity direction of fluid motion.

10. The converter of claim 8, wherein the longitudinal axes are staggered in two directions substantially perpendicular to the longitudinal axes.

11. The converter of claim 1, further comprising a plurality of movable elements defining a two-dimensional array.

12. The converter of claim 1, wherein the foundation comprises a fixed platform, or a floating moored platform, or a dynamically floated platform.

13. The converter of claim 1, wherein the each biasing mechanism includes a plurality of springs arranged on a plane substantially perpendicular to the longitudinal axis, each biasing mechanism coupled to the movable element for allowing motion of the movable element orthogonally to the longitudinal axis of the movable element.

14. A converter for producing useable energy from fluid motion of a fluid medium, the converter comprising:
   a support structure including a platform submerged in the fluid medium and a plurality of piles directly affixed on the platform, each pile substantially perpendicular to the platform and to a velocity direction of the fluid motion;
   a plurality of movable elements, each movable element having a longitudinal axis, the movable elements submerged in the fluid medium and movably supported between the piles with biasing mechanisms along first and second axes perpendicular to the longitudinal axis such that each movable element can move relatively to the piles in response to vortex induced fluid motion, or galloping fluid motion or combination thereof; and
   at least one power device supported on the support structure and coupled to at least one movable element, the power device converting motion of the movable elements relatively to the structure to useable energy.

15. The converter of claim 14, wherein each movable element can oscillate relatively to the support structure in two non-parallel planes.

16. The converter of claim 14, wherein each biasing mechanism includes a plurality of springs arranged on a plane substantially perpendicular to the longitudinal axis, the biasing mechanism coupled to each movable element for allowing motion of each movable element orthogonally to the longitudinal axis of the movable element.

17. A method for converting fluid motion of a fluid medium to useable energy, the method comprising:
   positioning a structure having a platform and a plurality of parallel piles directly affixed on the platform in the fluid medium, the piles perpendicular to a velocity direction of the fluid motion;
   submerging at least one movable element in the fluid medium, the movable element defining a longitudinal axis;
   movably supporting the movable element between two piles with a biasing mechanism for motion along first and second axes perpendicular to the longitudinal axis;
   allowing each of vortex induced fluid motion, or galloping fluid motion or combination thereof to move the movable element relatively to the piles; and converting the motion of the movable element relatively to the structure into useable energy.

18. The method of claim 17, wherein the biasing mechanism includes a plurality of springs arranged on a plane substantially perpendicular to the longitudinal axis, the method further comprising biasing the movable element for motion orthogonally to the longitudinal of the movable element.

19. The method of claim 17, further comprising biasing the movable element for motion in two non-parallel planes.

* * * * *

UNITED STATES PATENT AND TRADEMARK OFFICE
CERTIFICATE OF CORRECTION

PATENT NO. : 7,493,759 B2  Page 1 of 1
APPLICATION NO. : 11/272504
DATED : February 24, 2009
INVENTOR(S) : Michael M. Bernitsas et al.

It is certified that error appears in the above-identified patent and that said Letters Patent is hereby corrected as shown below:

| | |
|---|---|
| Column 3, line 28 | "be" should be --by--. |
| Column 7, line 54 | Delete the quotation mark before "A.K.". |
| Column 8, line 31 | "mount" should be --amount--. |
| Column 8, line 44 | "Coating is" should be --Coatings--. |
| Column 8, line 55 | "Me" should be --ME--. |
| Column 10, line 20 | After "fewer", insert --than--. |
| Column 11, line 12 | After "ratio", insert --is--. |
| Column 11, line 66, claim 7 | After "with", delete "a". |
| Column 12, line 18, claim 13 | After "wherein", delete "the". |

Signed and Sealed this

Twenty-eighth Day of July, 2009

JOHN DOLL
*Acting Director of the United States Patent and Trademark Office*